United States Patent [19]
Raether

[11] 3,970,141
[45] July 20, 1976

[54] DISLODGING DEVICE
[75] Inventor: Roger J. Raether, Ortonville, Minn.
[73] Assignee: Erwin F. Wellendorf, Ortonville, Minn.
[22] Filed: May 27, 1975
[21] Appl. No.: 580,974

[52] U.S. Cl. .................. 165/47; 126/19.5; 126/271.1; 165/56
[51] Int. Cl.² ........................................ F24H 3/00
[58] Field of Search .................. 165/47, 48, 51, 52, 165/56; 126/19.5, 271.1; 237/12.3 A, 12.3 R

[56] References Cited
UNITED STATES PATENTS

| 2,325,901 | 8/1943 | Atkinson | 126/171.1 |
| 3,151,613 | 10/1964 | Howard | 126/271.1 |
| 3,189,021 | 6/1965 | Giquere | 126/271.1 |
| 3,289,668 | 12/1966 | Drucker | 126/271.1 |
| 3,758,748 | 9/1973 | Reid | 165/56 |

Primary Examiner—Albert W. Davis, Jr.
Assistant Examiner—James D. Liles

[57] ABSTRACT

A heat radiating sled frame mountable under the base of an ice fishing shelter. When connected to a source of hot gas, the frame radiates heat, melting surrounding ice and freeing the frame and shelter for removal from the site where it has become frozen in place.

1 Claim, 4 Drawing Figures

DISLODGING DEVICE

The present invention relates to a heat radiating device for dislodging an ice fishing structure which has become embedded and frozen in place on the frozen surface of a lake or stream.

Fishing through ice in winter inside a shelter or "ice fishing house" has become a widely practiced sport in the northern climes of the United States and Canada. Fishing houses are normally constructed on a base frame upon which is suspended a floor having an opening through which a hole may be chopped or routed through the ice. After ice on the surface of lakes or streams has frozen to a sufficient depth, the houses may be towed on a trailer or dragged behind an automobile onto the lake surface and often left for the entire winter season. Over the course of the winter, however, due to snow, intermittent thawing and heat generated from within the structure, the structure becomes firmly embedded and frozen into the surface of the lake. When time arrives to remove the structure from the ice, it is a laborious and time-consuming process to dislodge it by manually chopping it free. Moreover, often the structure is partially damaged during removal.

In accordance with the present invention, I have provided a heat radiating grame means which will actually serve as the foundation for the structure. During the course of the season, the frame becomes firmly embedded in the ice as normally occurs at the base of the ice fishing structure. When it is desired to remove the structure from the lake or stream at the end of the winter season, hot gas provided by the exhaust from the engine of the vehicle to be used for hauling the structure away is passed through the frame. In just a few minutes' time, heat radiating from the frame melts the surrounding ice and frees the structure so that it can be readily dragged or towed away. This and other advantages of my invention will become apparent from the following description of an illustrative embodiment taken in conjunction with the appended drawing, wherein like reference characters refer to corresponding parts in the several views, and in which:

Figure 1:
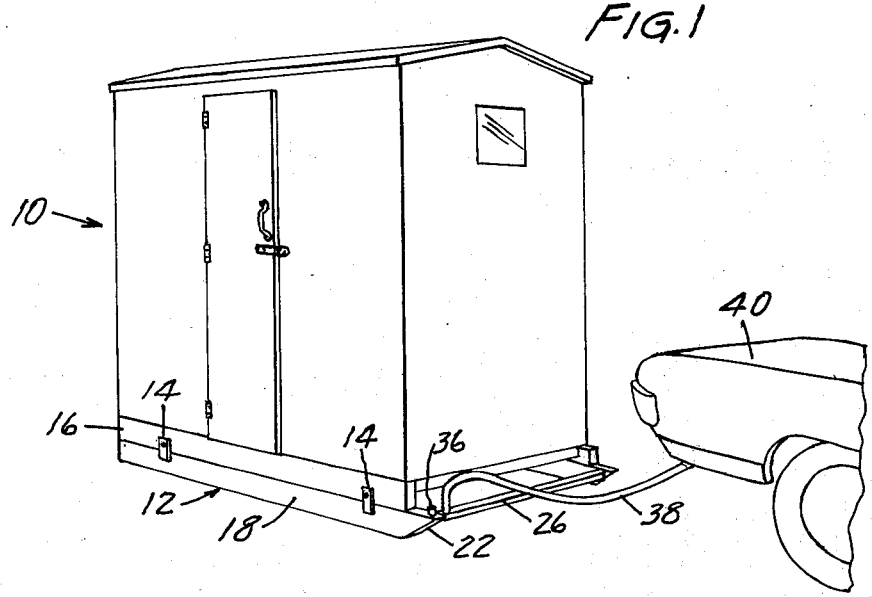
FIG. 1 is a view in perspective showing an ice fishing house or structure mounted in place on my novel heat radiating frame, connected to an automobile exhaust for dislodging from ice.
Figure 2:
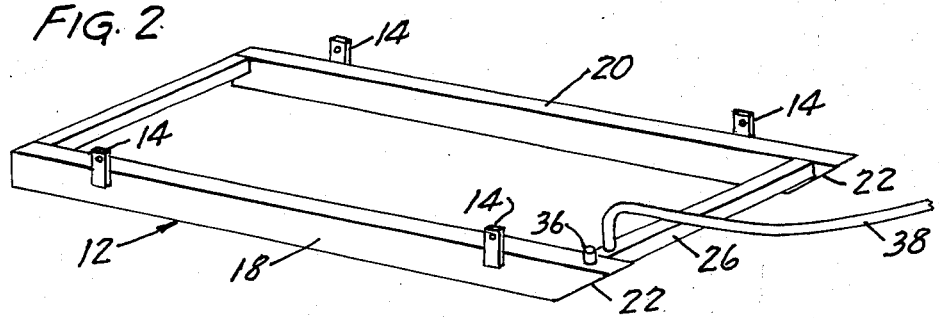
FIG. 2 is a view in perspective of the heat radiating frame of FIG. 1.
Figure 3:
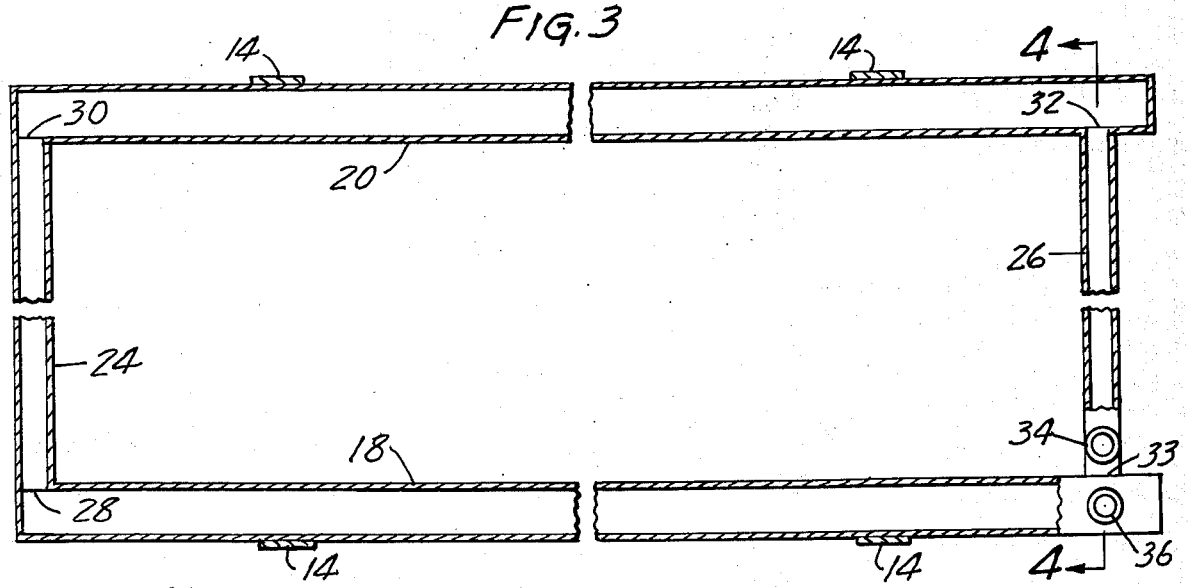
FIG. 3 is a plan view broken away to show the interior of the heat radiating frame.
Figure 4:
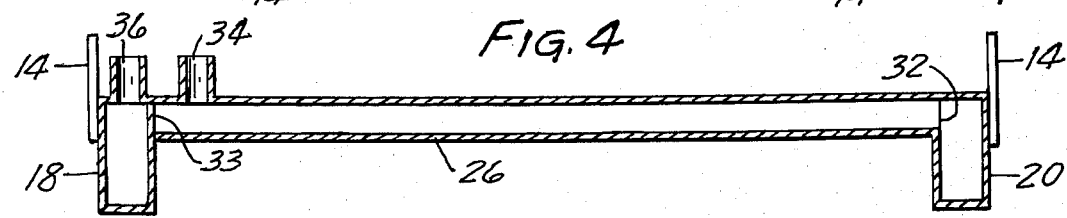
FIG. 4 is a section taken along the lines 4—4 of FIG. 3.

Referring now to the drawing, a rectangular ice fishing structure 10 is set on the heat radiating frame 12 and held in place thereon by nails or screws extending through upright tabs 14 and into the base 16 of the fishing house, the tabs 14 being welded to the outer side of parallel skids 18 and 20 of the frame 12. The skids are hollow of rectangular cross-section and are enclosed along their length and at their ends. They may be fabricated, for example, from 14 or 16 gauge steel. The forward ends 22 of the skids are beveled at an angle from top to bottom to allow the frame and house to be dragged into position over the ice on a lake in the early winter, and from the lake at the end of the winter season.

Joining the skids together adjacent to the ends thereof are a pair of connector tubes 24 and 26, each of which may be formed, for example, from a pair of 2×2×⅛ inches angle steel assembled and welded together along their contiguous free edges to form a sealed tube of rectangular cross-section. The connector tubes 24 and 26 join the skids 18 and 20 near the top thereof such that the upper surfaces of the skids and tubes are substantially flush. In this way, the skids 18 and 20 extend below the undersurface of the connector members 24 and 26 so they will not unduly drag on the snow or ice when the house is dragged on the skids 18 and 20. The frame thus acts as a sled for the fishing house 10.

At the point where connector tube 24 joins skids 18 and 20, the skids are provided with interior holes or ports 28 and 30 respectively by which the interior of the skids communicates with the interior of the connector tube 24. Skid 20 is also provided with an interior port 32 at the place at which the front connector tube 26 joins thereto allowing communication between the interior or skid 20 and connector tube 26. However, as will be explained shortly, no interior port is provided at the junction 33 of connector tube 24 and skid 18. Thus, communication therebetween is prevented.

An inlet port 34 in the form of a piece of 2 inch steel pipe welded into a hole is provided in connector tube 26 adjacent the junction thereof with skid 18. Similarly, an outlet port 36 is provided in the forward end of skid 18 on the opposite side of the wall partitioning the tube 26 and skid 18. It will be seen that a continuous interior flow path is provided from the inlet port 34 into and through tube 26, port 32, skid 20, port 30, tube 24, port 28, and finally through skid 18 and out through outlet port 36.

The skids are of sufficient length and so spaced by the connector tubes so as to substantially coincide with the frame of the fishing structure, but with the front end protruding so as to allow access to outlet and inlet ports 34 and 36. In the case of an ice fishing structure having the general standard dimensions of 4 feet in length by eight feet in width, the skids may be 8 feet 6 inches in length and the connector tubes of such length, in relation to the width of the skids, such that the skids are parallel with outside surfaces thereof spaced four feet apart, thus coinciding with the base of the structure.

In use, the fishing structure is set upon my novel frame and dragged into place ordinarily behind an automobile or truck after a lake or river has frozen to a sufficient depth at the start of the winter season. Over the season, generally due to intermittent freezing and thawing snow, contributed to by heat generated from within the structure, the frame will firmly freeze into the ice. Possibly the base of the structure will also freeze in place. When it is desired to move the structure, a flexible hose 38 is fastened at one end to the inlet port 34 and at the other end to the exhaust pipe of an automobile 40 or other source for heated gas. Hot exhaust gas is forced through the above-described flow path, i.e., through the length of skid 20, through connector tube 24, through skid 18, and finally through connector tube 26 and out the outlet port 36. The wall portion 33 between skid 18 and tube 26 partitions the inlet and outlet tubes and serves as a means for deflecting and directing the bases through the desired flow path. In just a few minutes' time, heat radiating from the frame as a result of the flow of the heated exhaust gases will free the frame and structure. After removal of the hose 38, the structure is readily dragged away.

What I claim is:

1. A heat radiating frame mountable under the base of an ice fishing structure for dislodging the same from ice, comprising:

a pair of spaced opposed elongate generally parallel metal skids;

said skids each being hollow along its length, a pair of spaced opposed connector members respectively joined near the end thereof adjacent to the end of one of said skids to form a frame with each of said skids coinciding with opposite sides of the base of said structure, said connector members each being hollow along its length with said skids extending more deeply than said connector members, an exterior inlet port and an outlet port disposed adjacent one another and communicating with the interior of said frame, interior ports at the junction between said skids and connector members to provide a continuous path through and about the interior of said frame from one of said ports to the other, means for directing pressurized hot gas along said path, and means on said frame for retaining the structure thereon as said frame is dragged upon said skids.

* * * * *